United States Patent [19]
Sivan

[11] Patent Number: 6,160,848
[45] Date of Patent: Dec. 12, 2000

[54] CONDITIONAL REPLENISHMENT DEVICE FOR A VIDEO ENCODER

[75] Inventor: Zohar Sivan, Haifa, Israel

[73] Assignee: International Business Machines Corp., Armonk, N.Y.

[21] Appl. No.: 09/094,312

[22] Filed: Jun. 9, 1998

[30] Foreign Application Priority Data

Jan. 22, 1998 [EP] European Pat. Off. ............. 98480001

[51] Int. Cl.[7] .................................................. H04N 5/14
[52] U.S. Cl. ..................... 375/240.13; 382/251
[58] Field of Search .............. 375/240, 240.13; 348/384, 390, 400, 401, 402, 409, 415, 416, 420, 421, 699, 700; 382/232, 236, 238

[56] References Cited

U.S. PATENT DOCUMENTS 4,958,226  9/1990  Haskell ................................. 348/416
5,043,810  8/1991  Vreeswijk ............................. 348/413

OTHER PUBLICATIONS

"Video Coding for Low Bitrate Communication", Draft ITU–T Recommendation H.263, May 1996.

*Primary Examiner*—Chris S. Kelley
*Assistant Examiner*—Shawn S. An
*Attorney, Agent, or Firm*—Edward H. Duffield

[57] ABSTRACT

Conditional replenishment device in a video encoder having a motion estimator (22) providing a predicted block for each predefined block based upon estimating the motion between the predefined block of the current image and the corresponding block in the previous image, transformer (16) for transforming a prediction error resulting from the difference between the predicted block and the predefined block into the frequency domain, and quantizer (20) for quantizing the coefficients of the prediction error and providing the quantized coefficients to a video multiplex coding unit (30). Such a conditional replenishment device includes a change detector for producing a segmentation map in which each pixel of the predefined block is marked as moving or stationary, a motion determinator for determining whether there is a group of moving pixels the number of which exceeds a predetermined threshold defining a moving object in the image, and a coder for encoding only blocks containing the group of moving pixels.

14 Claims, 2 Drawing Sheets

CONDITIONAL REPLENISHMENT DEVICE FOR A VIDEO ENCODER

TECHNICAL FIELD

The present invention relates to the video encoding standard H.263 developed by the International Telecommunication Union (ITU) for very low bit-rate multimedia telecommunication and particularly to a conditional replenishment device for a video encoder.

BACKGROUND

The H.263 standard developed by the ITU (International Telecommunication Union) is a part of its H.324/H.323 recommendations for very low bit-rate multimedia telecommunication. The H.263 coding scheme which is described in "Video Coding for Very Low bit-rate Communication" Draft ITU-Recommendation H.263, may 1996, is based on earlier schemes used in H.261 and MPEG-1/2 standards, and using the Hybrid-DPCM concept comprising a motion estimation/compensation mechanism, and transform coding and quantization. Each image is divided into blocks of size 16×16 pixels (called macroblocks) and the macroblock in the current picture is predicted from the previous picture using motion estimation techniques. After the prediction, the macroblock is divided into four blocks of size 8×8 pixels. The prediction error is then transformed using the Discrete Cosine Transform (DCT) and the resulted coefficients are quantized and stored in the bitstream along with the motion parameters and other side information. The H.263 standard contains several improvements compared to earlier standards which allow a substantial reduction in the bit-rate while maintaining the same image quality. These improvements make it most suitable for very low bit-rate communication (but do not exclude it from being used in high bit-rate compression as well).

The H.263 coder supports several image sizes and does not have limitations on the bit-rate. These features allow the usage of H.263 in wide range of bandwidths such as the ones available in the Internet. ISDN, LAN, etc.

The H.263 includes the ability to indicate a block as <not coded> but the decision on whether a block is to be coded or not is not a part of the standard.

Real-life images very often contain information with a random nature (texture). When image sequences contain such static textures, the human observer rarely sees any difference in those textured parts when the video runs. If the image differences arm examined however, it is seen that large differences do exist. This is mainly due to the impact of imperfect sampling processes, microscopic camera movements, etc. The H.263 coder (as other standard coders like H.261 or MPEG1/2) is based on prediction and coding of the difference between predicted an original images. Textured static areas may therefore cause the encoder to spend many bits on these differences although no significant information should be coded there.

OBJECTS OF THE INVENTION

Therefore, the main object of the invention is to provide an improvement of the video coding of the H.263 standard type enabling significant improvements in coding efficiency while maintaining subjective image quality.

Another object of the invention is to provide a replenishment mechanism acting as a pre-processor in the video coding and determining which parts of the image are to be coded.

Another object of the invention is to provide a conditional image replenishment device incorporated in a H.263 encoder and based on a sophisticated change detector to segment the image into changed and unchanged blocks and then using this segmentation for classifying each block as coded or not-coded.

BRIEF SUMMARY OF INVENTION

Accordingly, the conditional replenishment device of the invention is used in a video encoder comprising motion estimation means providing a predicted block for each predefined block based upon estimating the motion between the predefined block of the current image and the corresponding block in the previous image, transform means for transforming a prediction error resulting from the difference between the predicted block and the predefined block into the frequency domain, and quantizing means for quantizing the coefficients of the prediction error in the frequency domain and providing the quantized coefficients to a video multiplex coding unit, wherein the quantized coefficients are de-quantized and inverse transformed to give back the prediction error which is added to the predicted block whereby the result is provided to the motion estimation means in order to get a new current predicted block. Such a conditional replenishment device comprises change detection means for producing a segmentation map in which each pixel of the predefined block is marked as moving or stationary, motion determination means for determining whether there is a group of moving pixels the number of which exceeds a predetermined threshold defining a moving object in the image, and coding means for encoding only blocks containing the group of moving pixels.

Another aspect of the invention is a process of conditionally replenishing the video image wherein the analyzed block is coded if the number of moving pixels in the analyzed block exceeds a first predetermined threshold, or if the number of moving pixels in a group of blocks adjacent to the analyzed block exceeds a second predetermined threshold, or if there is no texture similarity between the analyzed block of the current image and the corresponding block of the previous image.

BRIEF DESCRIPTION OF THE DRAWINGS

The objects, features and other characteristics of the invention will become more apparent from the following detailed description with reference to the accompanying drawings in which.

DETAILED DESCRIPTION OF THE INVENTION

Figure 1:
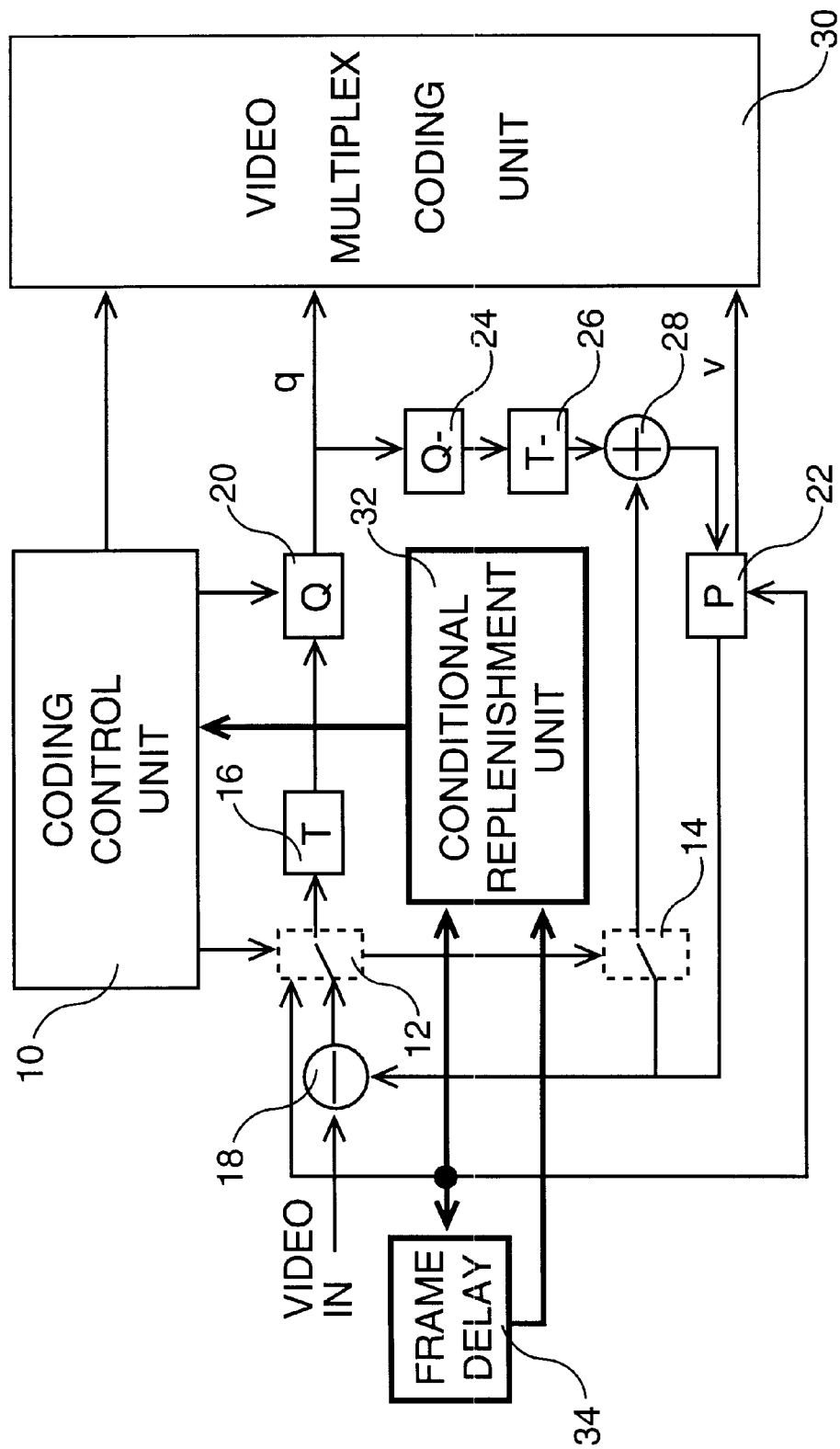
FIG. 1 is a block-diagram of the H.263 encoder incorporating the conditional replenishment unit according to the invention.

The proposed conditional replenishment mechanism is a separate module which is connected to the H.263 encoder. The schematic description of the H.263 encoder including the conditional replenishment module is shown in FIG. 1 with the additional module and its connections emphasized.

The H.263 encoder is based on the hybrid-DPCM scheme which is used in most of the standard video coders today. When the encoding function has to be implemented, Coding Control Unit 10 controls switching circuits 12 and 14 as illustrated in FIG. 1

The encoder is composed of a transform coder 16 which transforms a prediction error found by subtracting in subtractor 18 the current macroblock received in input from a predicted corresponding macroblock into the frequency domain by using the Discrete Cosine Transform (DCT) in which the information is represented in a compact way suitable for compression. The DCT coefficients are then quantized in quantizer 20 with many fewer bits. This quantization, which provides a quantizing index q for transform coefficients, introduces the lossy aspect of the video encoder.

The predicted macroblock used to determine the prediction error is provided by a motion estimation unit 22 which provides motion vectors v pointing to the chosen macroblock in the previous image.

The prediction error and the motion vectors v form the information needed for the reconstruction process in the decoder. Indeed, the prediction of the current macroblock is performed with respect to the previous reconstructed image in a similar way as is done in the decoder to avoid any mismatch. To achieve this, a complete decoder is actually implemented in the encoder loop. All the information sent by the encoder to the decoder is coded using Hufman coding which represents the bits in a compact and efficient way. The reconstruction is performed by taking the quantized and transformed prediction error and performing inverse quantization in inverse quantizer 24 and inverse DCT (IDCT) in inverse Transform Coder 26. Then, the macroblock predicted from the previous reconstructed image is added to the prediction error in adder 28 to form the current reconstructed block provided to motion estimation unit 22. Note that this process is conducted on each macroblock of the image.

The control information from Coding Control Unit 10, quantizing index q for transform coefficients and motions vectors v are then provided to the Video Multiplex Coding Unit 30.

The Conditional Replenishment Unit 32 according to the invention is an add-on to the encoder illustrated in FIG. 1 and does not affect the resultant bitstream. Frame delay 34 is used to get the current original frame and delay it by one frame. It thus becomes the previous original frame for the next image analysis and is used as input to Conditional Replenishment Unit 32 together with the current image.

Conditional Replenishment Unit 32 comprises a change detector which produces a segmentation map, in which each image pixel is marked as moving or stationary. It is based on a statistical model of the difference signal (between the current and previous original frame) and the moving/stationary segmentation map. The change detection problem is formalized as a statistical Maximum Aposteriori Problem (MAP) and is solved using an iterative minimization method. To adapt the detector to image content, the image is first divided, on a block of size 16×16 pixels basis, into smooth and non-smooth regions. This segmentation of the blocks is based on an Auto Regressive (AR) model of the data. The change detector itself works on a pixel level. More details on the smooth/non-smooth segmentation and the change detector mathematical modeling and structure can be found in "Change detection for image sequence coding", Z. Sivan and D. Malah, Proc. Picture Coding Symposium - PCS93 Article 14.1, Lausanne, Switzeland, March 1993.

Figure 2:
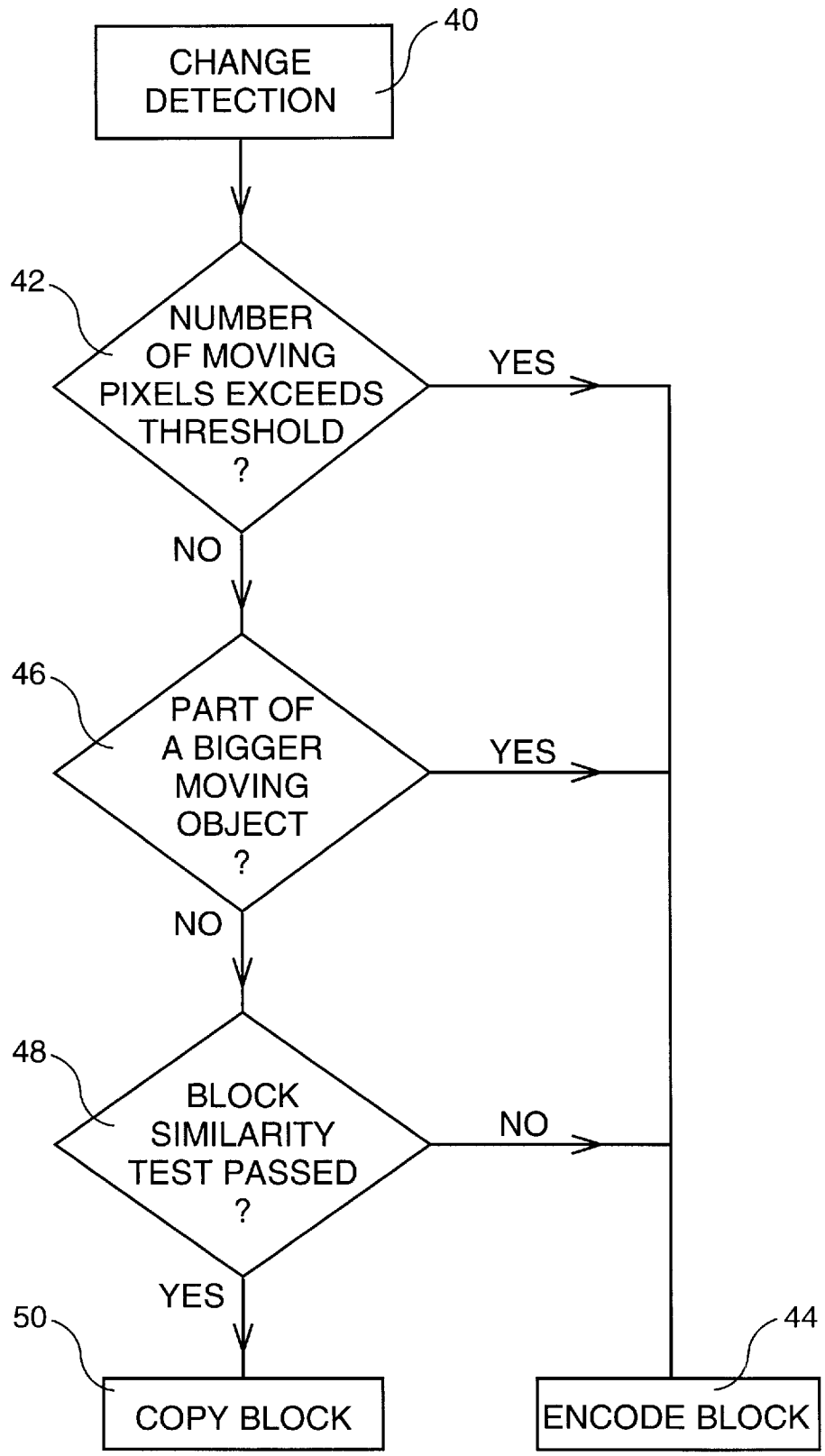
FIG. 2 is a flow chart illustrating the different steps of the process implemented in the conditional replenishment unit according to the invention.

The process implemented in Conditional Replenishment Unit 32 is illustrated in FIG. 2. The output of change detection step 40 is a segmentation map indicating moving and stationary pixels. For each analyzed macroblock, the number of moving pixels is counted. If this number exceeds a predefined threshold, step 42, the macroblock is coded in the usual way at step 44. If the number of moving pixels is below the threshold, another test determines if there is a group of moving pixels (representing a moving object) which are spread across more than one macroblock at step 46. Thus, even though the number of moving pixels for each analyzed macroblock is less than the first threshold but the total number of moving pixels for the group of adjacent macroblocks corresponding to the moving object exceeds a second threshold, the analyzed macroblock is also coded (step 44). In this test, the adjacent pixels on the two sides of the macroblock boundary are tested to see if there is a continuation of the moving area in the adjacent blocks. If the test of step 46 fails, the macroblock from the current image and the one at the matching position in the previous image are compared at step 48, for texture similarity using the Auto Regressive model parameters found in the smooth/non smooth segmentation mentioned above. Such a test covers the case of a textured object moving over a textured background, a case which cannot be detected by the change detection due to the random nature of the textured areas.

After a macroblock has been analyzed, either it is coded (step 44) as is defined in the H.263 standard (DCT, quantization and VLC coding), or it is to be copied, (step 50). The option to declare the macroblock as "not-coded" is used as defined in the H.263 standard. A macroblock defined like this does not contain any DCT coefficient data or motion vector data.

Since each macroblock is divided into four blocks, which are coded separately, the conditional replenishment module tests the macroblock to see which blocks contain the moving pixels. Only blocks that contain a number of moving pixels above a pre-defined threshold are coded and the rest are copied using the method described previously. This way, more savings of bits can be achieved by avoiding the need to code the entire macroblock.

To avoid possible accumulation of errors in the encoding process (since changes are detected between two successive images), there is an option to build the reference image, used in the change detector with the current image, in a different way. Only blocks which are marked to be coded are copied from the current image to the reference image in the change detector. Blocks which are marked copied are not overwritten. This way, the reference image keeps copied blocks from the past and if an error accumulates it is detected sooner or later and corrected in the encoder. This is an option and is used according to the input data characteristics.

With a Conditional Replenishment unit according to the invention which has been described above, every image is analyzed prior to the encoding process, and only blocks which contain significant and meaningful changes are coded. Other blocks are actually copied using the option in H.263 to define a block as "not-coded". This way, a significant reduction of the bit-rate can be achieved while maintaining the subjective quality of the reconstructed sequence. With this method, the previous image used in the change detector is updated only with blocks which are to be coded. Copied blocks are kept in that image, so accumulated errors are detected eventually. The amount of savings is highly dependent on image content, size and the desired bit-rate. A reduction of as high as 50% can be achieved according to test performed on standard ITU test sequences while maintaining subjective image quality.

What is claimed is:

1. In a video encoder comprising motions estimation means (22) providing a predicted block for each predefined block based upon estimating the motion between said predefined block of the current image and the corresponding block in the previous image, transform means (16) for transforming a prediction error resulting from the difference between said predicted block and said predefined block into the frequency domain, and quantizing means (20) for quantizing the coefficients of the prediction error in the frequency domain and providing the quantized coefficients to a video multiplex coding unit (30), wherein said quantized coefficients are de-quantized (24) and inverse transformed (26) to give back said prediction error and add it to said predicted block whereby the result is provided to said motion estimation means in order to get a new current predicted block; a conditional replenishment device characterized in that it comprises:

- change detection means for producing a segmentation map in which each pixel of said predefined block is marked as moving or stationary, said segmentation map being obtained by using an iterative minimization algorithm to solve a problem formalized as a statistical Maximum Aposteriori Problem;
- motion determination means for determining whether there is a group of moving pixels the number of which exceeds a predetermined threshold; and,
- coding means for encoding only blocks containing said group of moving pixels.

2. Conditional replenishment device according to claim 1, wherein said motion determination means comprises:

- first means for determining whether the number of moving of pixels of each analyzed block exceeds a first predetermined threshold,
- and second means for determining whether the number of moving pixels in a group of blocks adjacent to said analyzed block exceeds a second predetermined threshold when the number of moving pixels in said analyzed block does not exceed said first predetermined threshold.

3. Conditional replenishment device according to claim 2 further comprising similarity means for determining the texture similarity between said analyzed block of the current image and the corresponding block of the previous image in response to said first means determining that the number of moving pixels in said analyzed block does not exceed said first predetermined threshold and to said second means determining that the number of moving pixels in a group of adjacent to said analyzed block does not exceed said second predetermined threshold; and wherein said coding means encode also those blocks for which there is no such a similarity.

4. Conditional replenishment device according to claim 3, wherein said analyzed block is a macroblock composed of 16×16 pixels.

5. Conditional replenishment device according to claim 4, wherein said macroblock is divided into four blocks of 8×8 pixels and said first determining means determines which ones of said blocks in the macroblock contain a number of pixels which exceeds said first predetermined threshold in order to code only these blocks.

6. Conditional replenishment device according to claim 5, wherein said transform means (16) use the Discrete Cosine Transform (DCT) for transforming said prediction error into the frequency domain.

7. In a video encoder comprising motions estimation means (22) providing a predicted block for each predefined block based upon estimating the motion between said predefined block of the current image and the corresponding block in the previous image, transform means (16) for transforming a prediction error resulting from the difference between said predicted block and said predefined block into the frequency domain, and quantizing means (20) for quantizing the coefficients of the prediction error in the frequency domain and providing the quantized coefficients to a video multiplex coding unit (30), wherein said quantized coefficients are de-quantized (24) and inverse transformed (26) to give back said prediction error and add it to said predicted block whereby the result is provided to said motion estimation means in order to get a new current predicted block ; process of conditionally replenishing the video image wherein:

- the pixels for each block are detected as moving or stationary using an iterative minimization algorithm to solve a problem formalized as a statistical Maximum Aposteriori Problem;
- and wherein the analyzed block is coded if:
  - the number of moving pixels in said analyzed block exceeds a first predetermined threshold, or if
  - the number of moving pixels in group of blocks adjacent to said analyzed block exceeds a second predetermined threshold.

8. Process of claim 7 further comprising steps of conditionally replenishing, wherein said analyzed block is a macroblock of 16×16 pixels.

9. Process of claim 8 further comprising steps of conditionally replenishing, wherein said macroblock is divided into four blocks of 8×8 pixels and wherein it is determined which ones of said 8×8 blocks in the macroblock contain a number of pixels exceeding said first predetermined threshold in order to code only these blocks.

10. In a video encoder comprising motions estimation means (22) providing a predicted block for each predefined block based upon estimating the motion between said predefined block of the current image and the corresponding block in the previous image, transform means (16) for transforming a prediction error resulting from the difference between said predicted block and said predefined block into the frequency domain, and quantizing means (20) for quantizing the coefficients of the prediction error in the frequency domain and providing the quantized coefficients to a video multiplex coding unit (30), wherein said quantized coefficients are de-quantized (24) and inverse transformed (26) to give back said prediction error and add it to said predicted block whereby the result is provided to said motion estimation means in order to get a new current predicted block; a conditional replenishment device comprising:

- change detection means for producing a segmentation map in which each pixel of said predefined block is marked as moving or stationary;
- motion determination means for determining whether there is a group of moving pixels the number of which exceeds a predetermined threshold defining a moving object in the image,
- coding means for encoding only blocks containing said group of moving pixels; and,
- similarity means for determining the texture similarity between said analyzed block of the current image and the corresponding block of the previous image in response to said determination means determining that the number of moving pixels in said analyzed block does not exceed said first predetermined threshold; and wherein said coding means encode also those blocks for which there is no such a similarity.

11. Conditional replenishment device according to claim 10, wherein said analyzed block is a macroblock composed of 16×16 pixels.

12. Conditional replenishment device according to claim 11, wherein said macroblock is divided into four blocks of 8×8 pixels and said first determining means determines which ones of said blocks in the macroblock contain a number of pixels which exceeds said first predetermined threshold in order to code only these blocks.

13. Conditional replenishment device according to claim 12, wherein said transform means (16) use the Discrete Cosine Transform (DCT) for transforming said prediction error into the frequency domain.

14. Process of claim 7 wherein the analyzed block may be further coded if there is no texture similarity between said analyzed block of the current image and the corresponding block of the previous image.

* * * * *